United States Patent
Kim et al.

(10) Patent No.: US 7,804,957 B2
(45) Date of Patent: Sep. 28, 2010

(54) COPY PROTECTION METHOD, CABLECARD MODULE, AND VIDEO SYSTEM OF DIGITAL CABLE BROADCASTING CHANNEL ACCORDING TO PREDETERMINED DIGITAL CABLE BROADCASTING STANDARD

(75) Inventors: Ki-ho Kim, Seoul (KR); Eun-kyung Kang, Seoul (KR); Do-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1063 days.

(21) Appl. No.: 11/283,781

(22) Filed: Nov. 22, 2005

(65) Prior Publication Data

US 2006/0239456 A1 Oct. 26, 2006

Related U.S. Application Data

(60) Provisional application No. 60/674,294, filed on Apr. 25, 2005.

(30) Foreign Application Priority Data

Apr. 23, 2005 (KR) ............... 10-2005-0033809

(51) Int. Cl.
*H04N 7/167* (2006.01)

(52) U.S. Cl. ............... 380/201; 725/31; 725/131; 725/139; 725/151; 386/E5.004; 348/E7.061

(58) Field of Classification Search ............... 380/201; 725/131, 151, 25, 31, 139; 386/E5.004; 348/E7.061
See application file for complete search history.

(56) References Cited

U.S. PATENT DOCUMENTS

| | | | |
|---|---|---|---|
| 2004/0125953 A1 | 7/2004 | Cho et al. | |
| 2006/0236355 A1* | 10/2006 | Kim et al. | 725/100 |
| 2006/0242069 A1* | 10/2006 | Peterka et al. | 705/50 |

FOREIGN PATENT DOCUMENTS

| | | |
|---|---|---|
| CN | 1489386 A | 4/2004 |
| JP | 2004-7494 A | 1/2004 |
| JP | 2004-104470 A | 4/2004 |
| WO | WO 01/05150 A1 | 1/2001 |

OTHER PUBLICATIONS

Cable Television Laboratories, "CableCARD Copy protection System Interface Specification", Mar. 31, 2005, Document No. OC-SP-CCCP-IF-C01-050331.*

Cable Television Laboratories, Inc., CableCARD™ Copy Protection 2.0 Specification, Jul. 8, 2005, Document No. OC-SP-CCCP2.0-I02-050708.

* cited by examiner

*Primary Examiner*—Benjamin E Lanier
*Assistant Examiner*—Hadi Armouche
(74) *Attorney, Agent, or Firm*—Sughrue Mion, PLLC

(57) ABSTRACT

A copy protection method of a digital cable broadcasting channel according to a predetermined digital cable broadcasting standard is provided which comprises changing a channel to a first digital cable broadcasting channel and exchanging a copy protection value of the digital cable broadcasting standard between a CableCARD module and a video device corresponding to the channel change operation of the first digital cable broadcasting channel without regard to at least one former channel with respect to the first digital cable broadcasting channel.

13 Claims, 5 Drawing Sheets

FIG. 1
(RELATED ART)

| CCI VALUE(EMI) | MEANING |
|---|---|
| 00 | COPY FREE : COPY NOT RESTRICTED |
| 01 | NOT MORE COPY : NO FURTHER COPYING IS PERMITTED |
| 10 | ONE COPY : ONE GENERATION COPY IS PERMITTED |
| 11 | NEVER COPY : COPYING IS PROHIBITED |

FIG. 5

| CCI VALUE(APS) | MEANING |
|---|---|
| 00 | COPY PROTECTION ENCODING OFF |
| 01 | AGC PROCESS ON, SPLIT BURST OFF |
| 10 | AGC PROCESS ON, 2 LINE SPLIT BURST ON |
| 11 | AGC PROCESS ON, 4 LINE SPLIT BURST ON |

COPY PROTECTION METHOD, CABLECARD MODULE, AND VIDEO SYSTEM OF DIGITAL CABLE BROADCASTING CHANNEL ACCORDING TO PREDETERMINED DIGITAL CABLE BROADCASTING STANDARD

CROSS-REFERENCE TO RELATED APPLICATIONS

This application claims priority from Korean Patent Application No. 10-2005-0033809, filed on Apr. 23, 2005, in the Korean Intellectual Property Office, and from U.S. Provisional Patent Application No. 60/674,294, filed on Apr. 25, 2005, the disclosures of which are incorporated herein by reference.

BACKGROUND OF INVENTION

1. Field of Invention

Apparatuses and methods consistent with the present invention relate to a copy protection method, a CableCARD module, and a video system according to a predetermined digital cable broadcasting standard, and more particularly, to a copy protection method, a CableCARD module, and a video system which prevent a copy protection value of a digital cable broadcasting standard for content of an identical digital cable broadcasting channel in a channel changing operation from not being exchanged.

2. Description of the Related Art

Recently, the use of digital terrestrial television broadcasting and digital satellite broadcasting as broadcast mediums has increased rapidly all over the world.

Digital cable broadcasting standards include the Open-Cable standard which is used in America, Korea and elsewhere, the Digital Video Broadcasting-Cable (DVB-C) standard which is used in Europe, and the Integrated Service Digital Broadcasting-Cable (ISDB-C) standard which is used in Japan.

Of these standards, the OpenCable standard is based on the Moving Picture Experts Group-2 (MPEG-2) and the Data Over Cable Service Interface Specification (DOCSIS), which is used as a transmission standard of a cable modem. The OpenCable standard is a set of interface standards for a digital device such as a Set Top Box and digital television which are manufactured in accordance with the OpenCable specifications, as defined by Cable Television Laboratories, Inc.

The OpenCable standard specifies a separate conditional access part and receiving device (i.e., the television, the Set Top Box). Therefore, to satisfy Federal Communications Commission (FCC) regulations in the OpenCable standard, a Set Top Box includes of a video device (host) without the conditional access part and a CableCARD module which includes the conditional access part.

Hereinafter, a copy protection system of matching copy protection values between the video device and the Cable-CARD Module in the OpenCable standard will be described as follows. The OpenCable standard is embodied with two types of anti-copy systems.

One type of anti-copy system is the Conditional Access System (CAS) for a digital cable broadcast distribution system, and the other type is a Copy Protection System (CPS), which operates between the CableCARD module which is separated from the video device (host) and the video device. Generally, the anti-copy system refers to the CPS.

The existing digital broadcasting receiving device system has a function in which coded contents are received from the distribution system and the coded contends are selectively restored to a common video signal inside the receiving device, (i.e., an Embedded Conditional Access system). The CableCARD module operates as a security module which separates the conditional access function from the receiving device.

In CPS, encoded digital content, which is sent from distribution system, is decoded at the CableCARD module which is used as a subscriber receiving device, (i.e., a CA Payload Decryption) and the digital content is thus converted to a decoded form. Subsequently, the digital content is again encoded by CableCARD module according to the CPS standard (i.e., a CP Encryption), and the encoded content is then transmitted to the video device for reproduction. With such a coding scheme, CPS restricts the use of content which is transmitted from the CableCARD module to the video device.

CPS provides for different levels of copy protection based on the type of content which is received. For instance, no restriction may be placed on public channels which are received, while premium channels may include restrictions on copying the broadcast content.

The application standard of coding for the copy protection is given to a content producer which provided the appropriate content. The information, which determines whether the CPS is allowed or not, is referred to a Copy Control Information (CCI) value, and the CableCARD module of the receiver receives the CCI value corresponding to the transported digital content. Herein, the distribution system transports a message, which indicates whether the receiver is allowed to reproduce the premium digital contents with Private Section data in the MPEG-2 Transport Stream.

Therefore, the video device and the CableCARD module control whether the video device which receives the digital content of a particular broadcast channel can be copied or not based upon the CCI value exchange.

FIG. 1 illustrates an Encryption Mode Indicator (EMI) of the CCI value according to the OpenCable standard. As shown therein, content with a CCI value of "00" is not restricted in the number of copies that can be made, content with a CCI value of "01" restricts copying to two or more generations, content with a CCI value of "10" restricts copying to only one generation, and content with a CCI value of "11" is restricted from the making of any copies.

FIG. 2 illustrates a process of exchanging CCI values between the video device and the CableCARD module according the OpenCable standard.

At operation S20, a channel change request is received by the video device and then the channel is changed. Next, at operation S21, the video device determines whether the channel which corresponds to change channel request is a digital broadcasting channel. At operation S26, in a case where the requested channel is not a digital broadcasting channel, that is, in case where the channel is changed to an analog broadcasting channel, the channel change operation ends without the CCI value exchange.

Meanwhile, in a case where the channel is changed to a digital broadcasting channel, at operation S22, the Cable-CARD module transports a Request_CCI_Exchange message to the video device. At operation S23, the video device which receives the Request_CCI_Exchange message transports a Request_CCI_N_host message to the CableCARD module in response to the Request_CCI_Exchange message.

At operation S24, in a case where the Request_CCI_N_host message is received from the video device, the Cable-CARD module transports an Authentication CCI message to the video device, and at operation S25, the video device determines the CCI value from the Authentication CCI message which is received. Therefore, at operation S26, the channel change operation is finished. Accordingly, the video device controls whether the content of the selected digital broadcasting channel may be copied or not according to the CCI value which is determined.

Herein, in a case where the CCI value of the appropriate digital broadcasting channel is not received by the video device for any reason in the process where the video device changes to the digital broadcasting channel, the OpenCable standard indicates that the video device sets the CCI value of the digital broadcasting channel to a "11" value. That is, no copying is allowed of the content of the digital broadcasting channel if the video device does not receive the CCI value.

Various technical features related to the copy protection according to the OpenCable standard have been disclosed. For example, a conditional copy free with respect to a copy free is disclosed in Japan Patent first Publication No. 2004-7494, and coding of appropriate information and receiving and sending of coded information in the exchange of the CCI value are disclosed in PCT International Publication No. 2001-5150.

However, in OpenCable standard environments, in a case where the user changes the channel from an analog broadcasting channel to a digital broadcasting channel while viewing the analog broadcasting channel, there is a case that the CCI value exchange with respect to the digital broadcasting channel is not accomplished. Particularly, in case where the user changes the channel to the analog broadcasting channel while viewing the digital broadcasting channel, and the user converts the channel back to the former digital broadcasting channel, the error occurs because the CCI value exchange is not accomplished.

Therefore, copying content of a channel may be improperly restricted because the CCI value exchange does not occur due to the channel change operation from an analog channel to a digital channel.

Further, the user may recognize that the copying of the content of the digital broadcasting channel should be allowed and may therefore misconceive a copy error of the video device or the CableCARD module.

SUMMARY OF THE INVENTION

Accordingly, it is an aspect of the present invention to provide a copy protection method, a CableCARD module, and a video system which prevents a copy protection value of a digital cable broadcasting standard with respect to contents of an identical digital cable broadcasting channel in channel change from not being exchanged.

According to an aspect of the present invention, there is provided a copy protection method of a digital cable broadcasting channel according to a predetermined digital cable broadcasting standard, comprising: selecting a first digital cable broadcasting channel; and exchanging a copy protection value of the predetermined digital cable broadcasting standard between a CableCARD module and a video device which corresponds to the first digital cable broadcasting channel which is selected independent of at least one former channel which is selected prior to the first digital cable broadcasting channel.

According to an aspect of the present invention, the predetermined digital cable broadcasting standard may comprise an OpenCable standard; and the copy protection value comprises a Copy Control Information (CCI) value according to the OpenCable standard.

According to an aspect of the present invention, the at least one former channel may comprise an analog broadcasting channel which is selected prior to the first digital cable broadcasting channel, and a second digital cable broadcasting channel which is selected prior to the analog broadcasting channel.

According to an aspect of the present invention, digital content of the first digital cable broadcasting channel and digital content of the second digital cable broadcasting channel are identical and the first digital broadcasting channel and the second digital broadcasting channel are identical.

According to an aspect of the present invention, the exchanging the copy protection value of the digital cable broadcasting standard between the CableCARD module and the video device may comprise transmitting a Request_CCI_Exchange message from the CableCARD module to the video device which corresponds to the selecting of the first digital cable broadcasting channel; transmitting a Request_CCI_N_host message from the video device to the CableCARD module which corresponds to the transmitting of the Request_CCI_Exchange; and transmitting an Authentication CCI message from the CableCARD module to the video device in the response of the Request_CCI_N_host message.

According to an aspect of the present invention, there is provided a CableCARD module supporting a predetermined digital cable broadcasting standard, comprising: a CableCARD interface part which communicates with a video device through a CableCARD interface protocol; and a controller which exchanges a copy protection value of the predetermined digital cable broadcasting standard with the video device through the CableCARD interface part independent of at least one former channel which is selected prior to the digital cable broadcasting channel, wherein the digital cable broadcasting channel is received from the video device through the CableCARD interface part.

According to an aspect of the present invention, the predetermined digital cable broadcasting standard may comprise an OpenCable standard; and the copy protection value comprises a Copy Control Information (CCI) value according to the OpenCable standard.

According to an aspect of the present invention, the at least one former channel comprises an analog broadcasting channel which is selected prior to the first digital cable broadcasting channel, and a second digital cable broadcasting channel which is received prior to the analog broadcasting channel.

According to an aspect of the present invention, digital content of first digital cable broadcasting channel and digital content of the second digital cable broadcasting channel are identical and the first digital broadcasting channel and the second digital broadcasting channel are identical.

The foregoing and/or other aspects of the present invention may be achieved by providing a video system supporting a predetermined digital cable broadcasting standard, comprising: a video device; and a CableCARD module which exchanges a copy protection value of the digital cable broadcasting standard with the video device independent of at least one former channel which is selected prior to a digital cable broadcasting channel, wherein the digital cable broadcasting channel is received from the video device according to the predetermined digital cable broadcasting standard.

According to an aspect of the present invention, the digital cable broadcasting standard may comprise an OpenCable standard; and the copy protection value comprises a Copy Control Information (CCI) value according to the OpenCable standard.

According to an aspect of the present invention, the at least one former channel may comprise an analog broadcasting channel which is selected prior to the first digital cable broadcasting channel, and a second digital cable broadcasting channel which is selected prior to the analog broadcasting channel.

According to an aspect of the present invention, digital content of the first digital broadcasting channel and digital content of the second digital broadcasting channel are identical and the first digital broadcasting channel and the second digital broadcasting channel are identical.

BRIEF DESCRIPTION OF THE DRAWINGS

The above and/or other aspects of the prevent invention will become apparent and more readily appreciated from the following description of the exemplary embodiments, taken in conjunction with the accompany drawings, in which:

FIG. 1 illustrates an Encryption Mode Indicator (EMI) of a CCI value according to the OpenCable standard;

FIG. 5 illustrates an Analog Protection System Value (APS) among the CCI values which are supported in the OpenCable standard.

Figure 2:
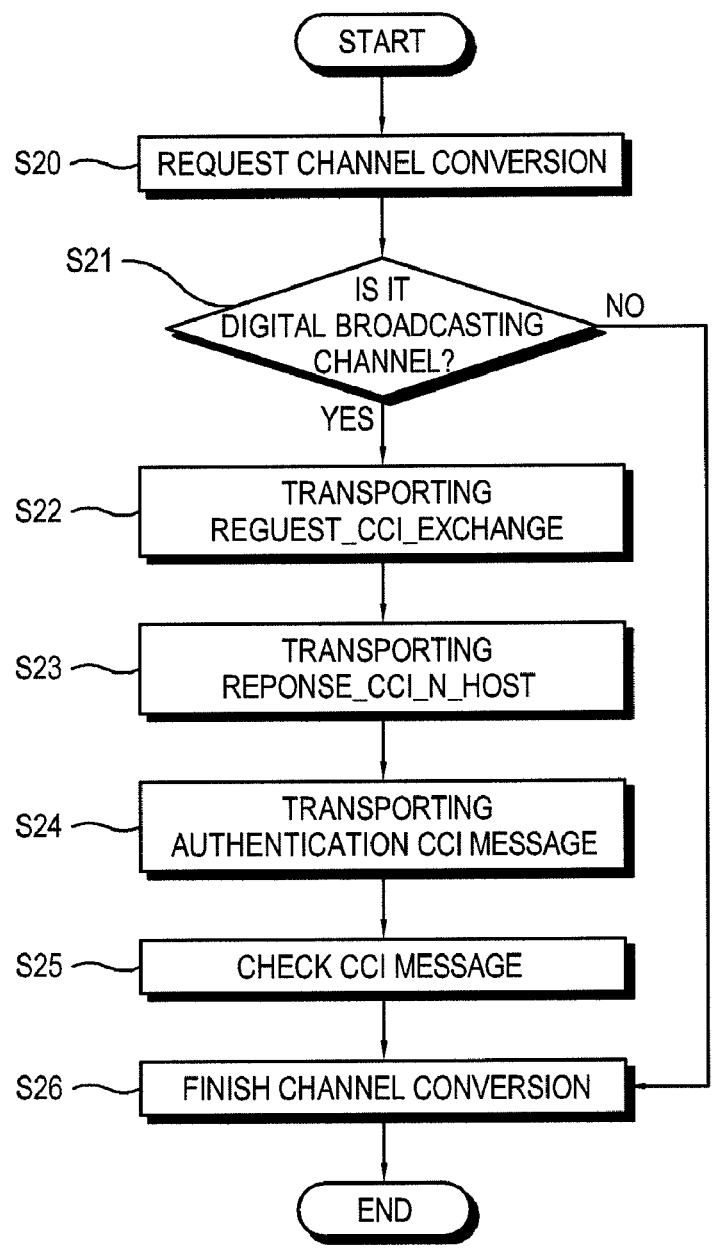
FIG. 2 illustrates an exchange process of the CCI values between a video device and a CableCARD module in the OpenCable standard.

DETAILED DESCRIPTION OF THE
EXEMPLARY EMBODIMENTS OF THE
INVENTION

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

Figure 3:
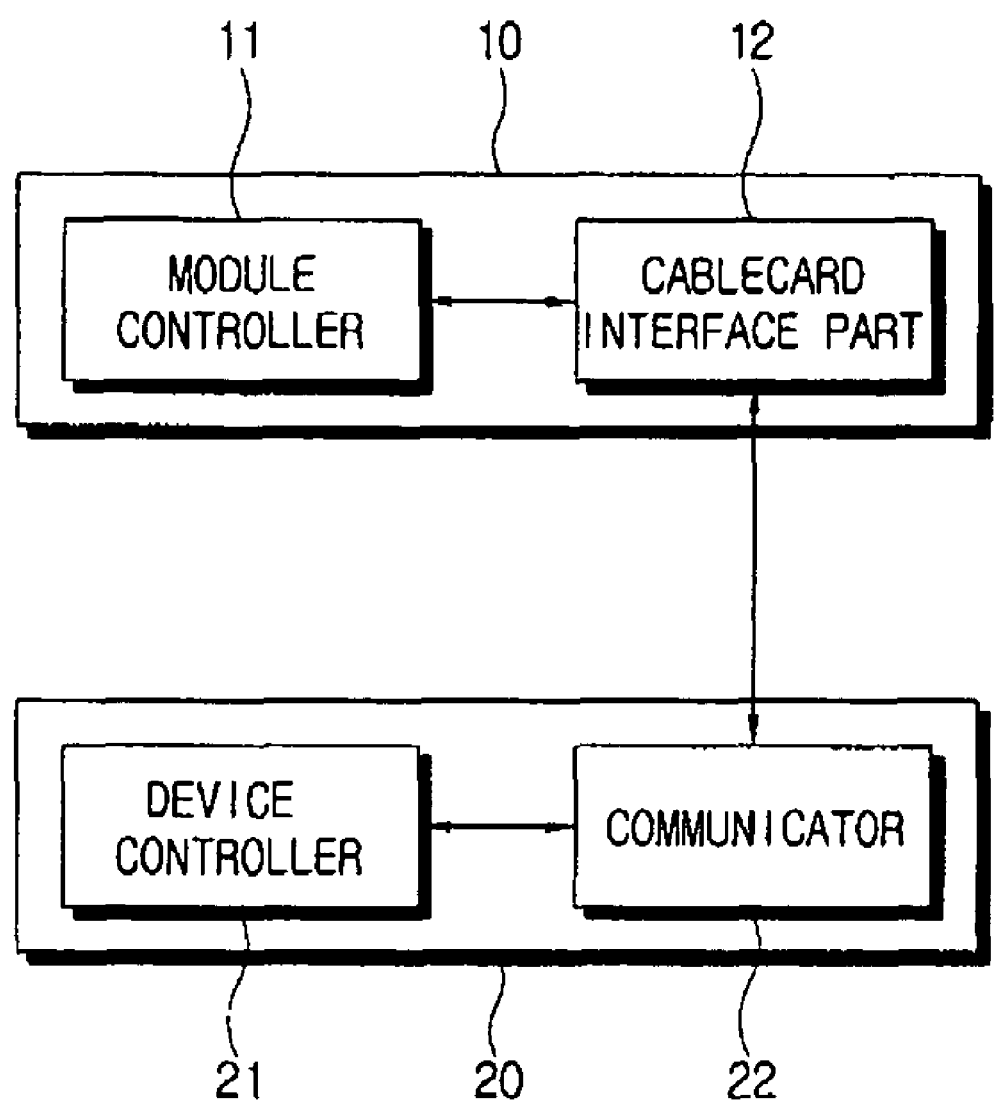
FIG. 3 is a control block diagram of the video device consistent with an exemplary embodiment of the present invention.

Referring to FIG. 3, a video system according to an exemplary embodiment of the present invention comprises a CableCARD module 10 and a video device 20. The CableCARD module 10 and the video device 20 supply a predetermined digital cable broadcasting standard. The restriction on copying content of a digital broadcasting channel is determined in the video device 20 according to an exchange of a copy protection value which is defined by an appropriate digital cable broadcasting standard.

Herein, the digital cable broadcasting standard according to an exemplary embodiment of the present invention is the OpenCable standard, and the copy protection value is a CCI value of the OpenCable standard.

The video device 20 determines whether a digital broadcasting channel is reproduced through the CableCARD module 10. Herein, the video device 20 selectively reproduces digital broadcasting channels and an analog video channels. Further, in the video device 10 according to an exemplary embodiment of the present invention, the reproduction of the digital broadcasting channel is determined through the CableCARD module 10, and the video device 10 may be applied to an OpenCable Set Top Box or cable-ready digital television, which may be of the type used in either a one-way or two-way cable distribution network.

The video device 20 comprises a communicator 22 for receiving digital broadcasting signals, analog broadcasting signals, and other signals from the CableCARD module 10 and sending the received signals to a device controller 21 for processing a broadcasting channel which is received through the communicator 22 and which exchanges the CCI value with the CableCARD module 10 to provide copy protection for content of the broadcasting channel.

The CableCARD module 10 comprises a CableCARD interface part 12 which is connected to the communicator 22 of the video device 20 and which uses the CableCARD interface protocol to communicate, and a module controller 11 which exchanges the CCI value with the video device 20 through the CableCARD interface part 12.

Herein, in a case where a digital cable broadcasting channel is received from the video device 20 through the CableCARD interface part 12, the module controller 11 exchanges the CCI value with the video device 20 independent of a type of at least one or more former channels. That is, the digital cable broadcasting channel is changed by the video device 20 without regard to the type of the present channel or the former present channel, the CableCARD module 10 constantly exchanges the CCI value with the video device 20.

Accordingly, the CableCARD module 10 prevents the CCI value with respect to the content of the digital cable broadcasting channel from not being exchanged.

Figure 4:
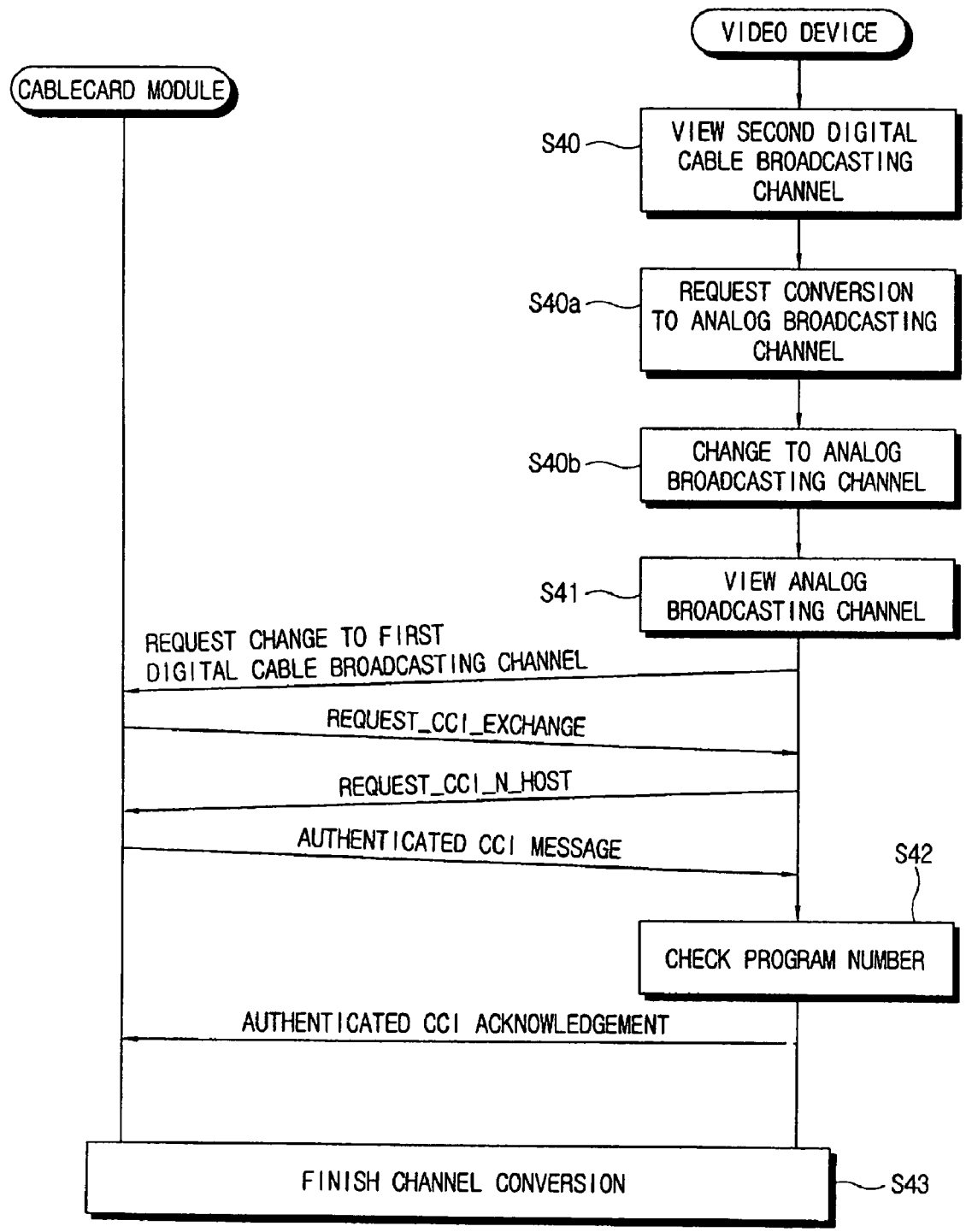
FIG. 4 illustrates a copy protection method according to an exemplary embodiment of the present invention.

Hereinafter, a copy protection method of the digital cable broadcasting channel according to the OpenCable standard will be described with reference to FIG. 4.

The case such that a CCI value is not exchanged between a CableCARD module 10 and a video device 20 when a channel change operation from a second digital cable broadcasting channel to an analog broadcasting channel, and from the analog broadcasting channel to a first digital cable broadcasting channel in sequence, and where the second digital cable broadcasting channel and the first digital cable broadcasting channel are the same channel and the same digital content is received (i.e., same program number) will be described as an example.

First, at operation S40, a second digital broadcasting signal is selected by the video device. Next, at operation S40a, a change channel signal for changing the second digital broadcasting signal to the analog broadcasting channel signal is received by the video device 20 while the user is viewing the second digital cable broadcasting channel through the video device 20. Then, at operation S40b, the device controller 21 of the video device 20 changes the present channel (i.e., the second digital broadcasting channel) to an analog broadcasting channel which is requested by the viewer.

At operation S41, a change channel signal for changing the analog broadcasting signal to a first digital broadcasting signal is received by the video device 20 while the user is viewing the analog broadcasting channel. In response to the change channel signal in operation S41, the device controller 21 of the video device 20 changes the channel to the first digital broadcasting channel.

Herein, the second digital cable broadcasting channel and the first digital cable broadcasting channel are the same channel and the same digital content (i.e., same program number) is being broadcast.

At this time, module controller 11 of the CableCARD module 10 exchanges the CCI value with the video device 20, which is receiving the first digital broadcasting channel by the following process.

First, the module controller 11 transports a Request_CCI_Exchange message to the video device 20 through the CableCARD interface part 12. Then, the device controller 21 of the video device 20 transports a Request_CCI_N_host message to the CableCARD module 10 through the communicator 22 in response to the Request_CCI_Exchange from the CableCARD module 10.

Next, the module controller 11 of the CableCARD module 10 transports an Authentication CCI message, which comprises the CCI value of the first digital cable broadcasting channel, to the video device 20 through the CableCARD interface part 12, in response to the Request_CCI_N_host message which is received through the CableCARD interface part 12 from the video device 20.

Subsequently, the Authentication CCI message is received through the communicator 22 and the device controller 21 of the video device 20 confirms the CCI value and the program number of the digital content of the first digital broadcasting channel. The video device 20 then transmits an Authentication CCI Acknowledgement message to the CableCARD module 10 through the communicator 22.

Therefore, at operation S43, the video device 20 and the CableCARD module 10 completes changing the channel to the first digital cable broadcasting channel, and the video device 20 determines the copy restriction of the digital content of the first digital cable broadcasting channel in accordance with the CCI value for first digital cable broadcasting channel.

The CCI value in the video system according to an exemplary embodiment of the present invention may comprise an Encryption Mode Indicator (EMI) value and/or an Analog Protection System (APS) value. The EMI value may be one of the EMI values of the OpenCable standard, which are shown in FIG. 1. Further, the APS value, which is related to the copy protection of the content of the analog broadcasting channel, may be defined as shown in FIG. 5. In an exemplary embodiment, the APS value corresponds to a Copy Protection System (CPS) standard of the OpenCable standard.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A computer-implemented copy protection method of a digital cable broadcasting channel according to a predetermined digital cable broadcasting standard, the method comprising:

selecting a first digital cable broadcasting channel; and exchanging a copy protection value of the predetermined digital cable broadcasting standard between a CableCARD module and a video device, wherein the exchanged copy protection value corresponds to the selected first digital cable broadcasting channel and the copy protection value is exchanged independent of at least one former channel which is selected prior to the first digital cable broadcasting channel, wherein the copy protection value is always exchanged between the CableCARD module and the video device in response to the selection of the first digital cable broadcasting channel, and the exchange occurs irrespective of a type of the at least one former channel, and wherein the at least one former channel comprises an analog broadcasting channel which is selected prior to the first digital cable broadcasting channel.

2. The computer-implemented copy protection method according to claim 1, wherein the predetermined digital cable broadcasting standard comprises an OpenCable standard; and the copy protection value comprises a Copy Control Information (CCI) value according to the OpenCable standard.

3. The computer-implemented copy protection method according to claim 2, wherein the at least one former channel further comprises a second digital cable broadcasting channel which is selected prior to the analog broadcasting channel.

4. The computer-implemented copy protection method according to claim 3, wherein digital content of the first digital cable broadcasting channel and digital content of the second digital cable broadcasting channel are identical, and the first digital broadcasting channel and the second digital broadcasting channel are identical.

5. The computer-implemented copy protection method according to claim 4, wherein the exchanging the copy protection value of the digital cable broadcasting standard between the CableCARD module and the video device further comprises:

transmitting a Request_CCI_Exchange message, from the CableCARD module to the video device, which corresponds to the channel change operation of the first digital cable broadcasting channel;

transmitting a Request_CCI_N_host message, from the video device to the CableCARD module, which corresponds to the transporting of the Request_CCI_Exchange message from the CableCARD module; and transmitting an Authentication CCI message from the CableCARD module to the video device in response to the Request_CCI_N_host message.

6. A CableCARD module which supports a predetermined digital cable broadcasting standard, the CableCARD module comprising:

a CableCARD interface part which communicates with a video device through a CableCARD interface protocol; and a controller which exchanges a copy protection value of the predetermined digital cable broadcasting standard with the video device through the CableCARD interface part independent of at least one former channel which is selected prior to selecting a first digital cable broadcasting channel, wherein the first digital cable broadcasting channel is received from the video device through the CableCARD interface part, and the exchanged copy protection value corresponds to the first digital cable broadcasting channel, wherein the controller always exchanges the copy protection value with the video device through the CableCARD interface part in response to the selection of the first digital cable broadcasting channel, and the exchange occurs irrespective of a type of the at least one former channel, and wherein the at least one former channel comprises an analog broadcasting channel which is selected prior to the first digital cable broadcasting channel.

7. The CableCARD module according to claim 6, wherein the predetermined digital cable broadcasting standard comprises an OpenCable standard; and the copy protection value comprises a Copy Control Information (CCI) value according to the OpenCable standard.

8. The CableCARD module according to claim 7, wherein the at least one former channel comprises an analog broadcasting channel which is selected prior to the first digital cable broadcasting channel, and a second digital cable broadcasting channel which is selected prior to the analog broadcasting channel.

9. The CableCARD module according to claim 8, wherein digital content of the first digital cable broadcasting channel and digital content of the second digital cable broadcasting channel are identical, and the first digital broadcasting channel and the second digital broadcasting channel are identical.

10. A video system which supports a predetermined digital cable broadcasting standard, the video system comprising:
   a video device; and
   a CableCARD module which exchanges a copy protection value of the predetermined digital cable broadcasting standard with the video device independent of at least one former channel which is selected prior to selecting a first digital cable broadcasting channel, wherein the first digital cable broadcasting channel is received from the video device according to the predetermined digital cable broadcasting standard, and the exchanged copy protection value corresponds to the first digital cable broadcasting channel,
   wherein the CableCARD module always exchanges the copy protection value with the video device in response to the selection of the first digital cable broadcasting channel, and the exchange occurs irrespective of a type of the at least one former channel which was selected prior to the first digital cable broadcasting channel, and
   wherein the at least one former channel comprises an analog broadcasting channel which is selected prior to the first digital cable broadcasting channel.

11. The video system according to claim 10, wherein the predetermined digital cable broadcasting standard comprises an OpenCable standard; and
   the copy protection value comprises a Copy Control Information (CCI) value according to the OpenCable standard.

12. The video system according to claim 11, wherein the at least one former channel further comprises a second digital cable broadcasting channel which is selected prior to the analog broadcasting channel.

13. The video system according to claim 12, wherein digital content of the first digital cable broadcasting channel and digital content of the second digital cable broadcasting channel are identical, and the first digital broadcasting channel and the second digital broadcasting channel are identical.

\* \* \* \* \*